(No Model.) 2 Sheets—Sheet 2.
E. BEACH.
ARGAND GAS BURNER.
No. 383,337. Patented May 22, 1888.
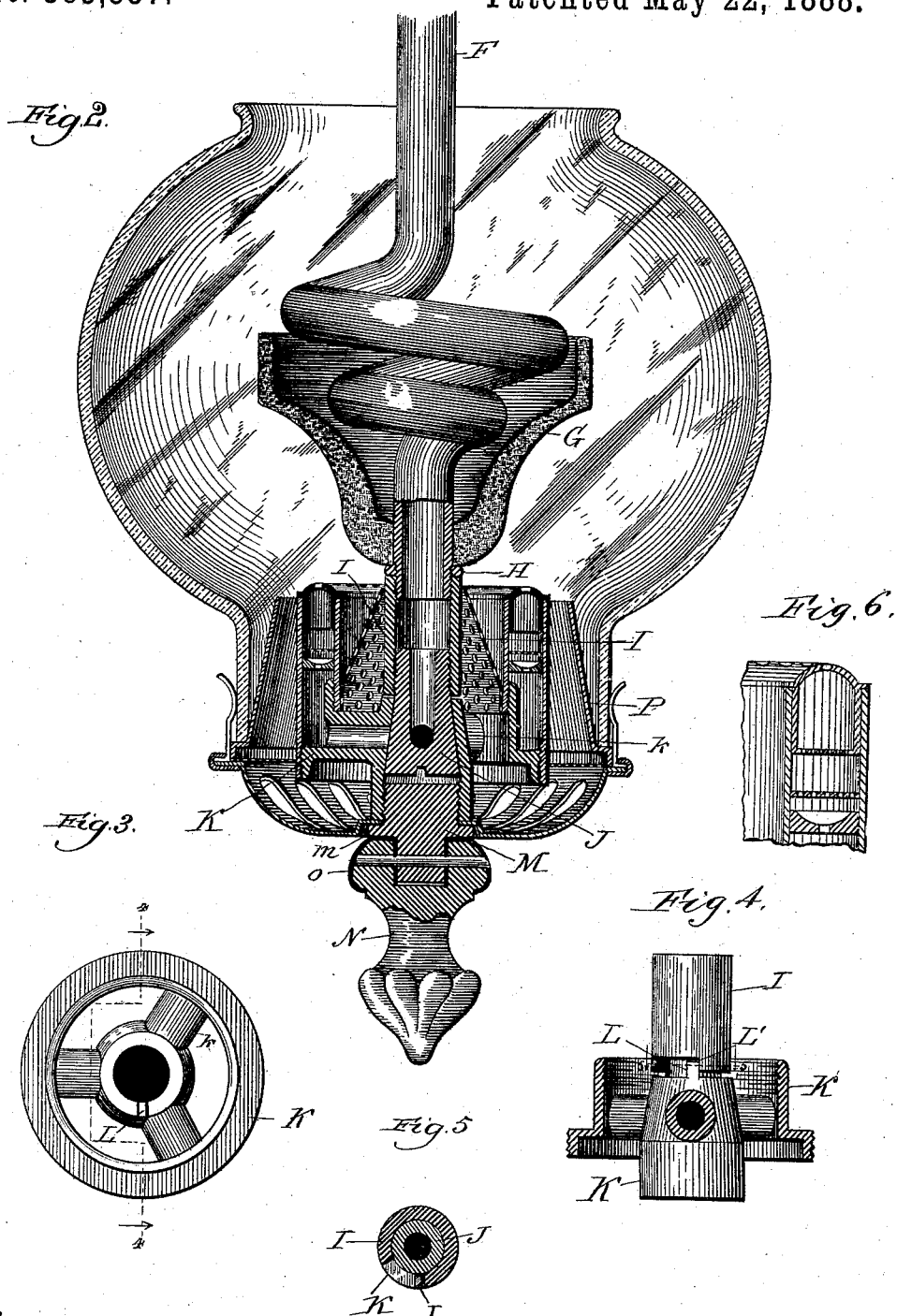

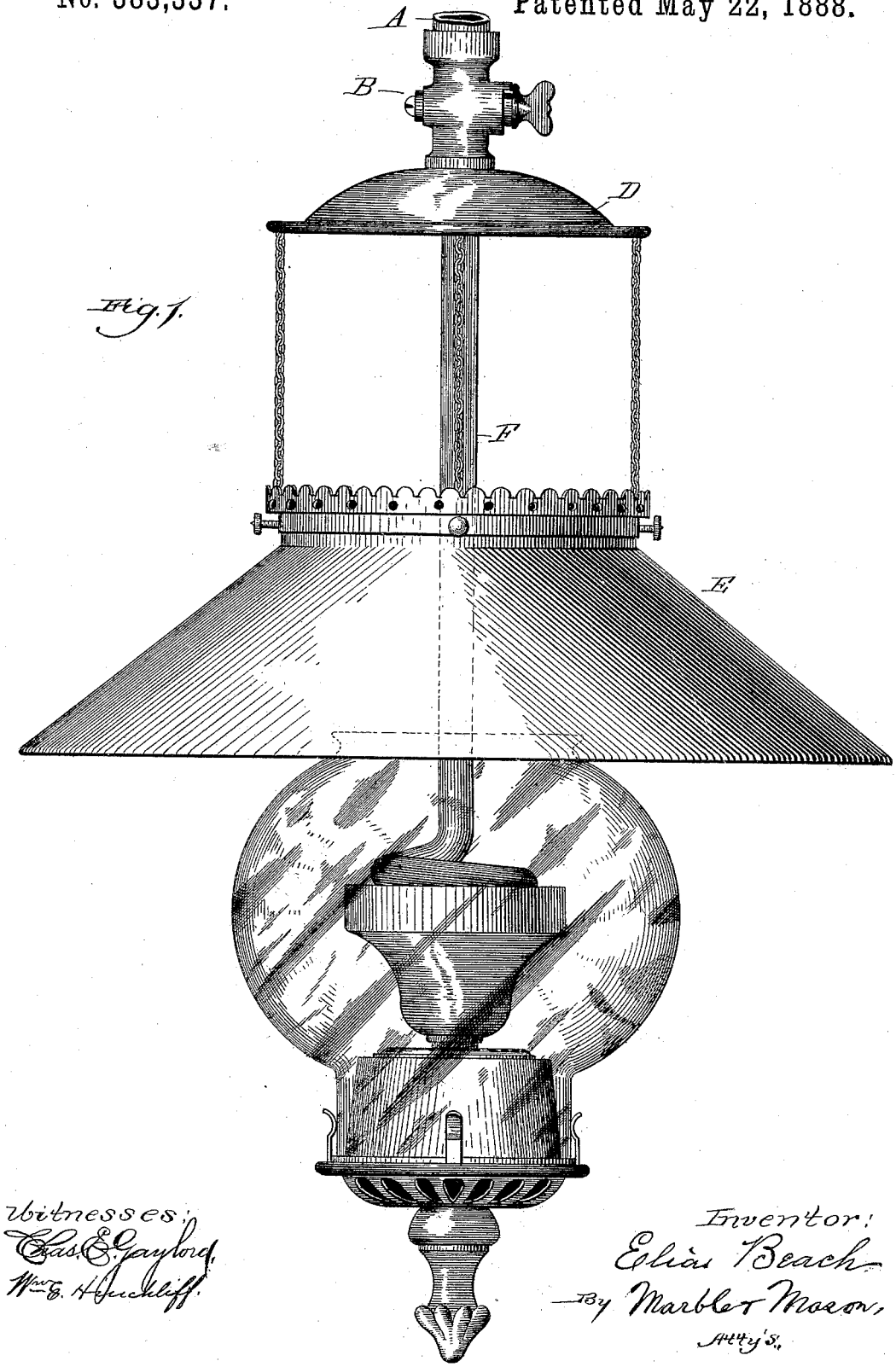

UNITED STATES PATENT OFFICE.

ELIAS BEACH, OF CHICAGO, ILLINOIS.

ARGAND GAS-BURNER.

SPECIFICATION forming part of Letters Patent No. 383,337, dated May 22, 1888.

Application filed February 21, 1887. Renewed April 19, 1888. Serial No. 271,124. (No model.)

*To all whom it may concern:*

Be it known that I, ELIAS BEACH, a citizen of the United States, residing at Chicago, in the county of Cook and State of Illinois, have invented certain new and useful Improvements in Argand Gas-Burners; and I do hereby declare the following to be a full, clear, and exact description of the invention, such as will enable others skilled in the art to which it appertains to make and use the same.

My invention relates to Argand gas-burners; and it consists in the construction and combination of parts, which will be fully hereinafter described, and pointed out in the claims.

The object of my invention is to provide a gas-burner in which the air and gas are heated before combustion takes place, in order that they may more readily unite and produce perfect combustion; to do away with the multiplicity of parts usually surrounding hanging or suspended lamps that obstruct the proper diffusion of light, and to provide more simple and efficient means for adjusting and regulating the parts of said burner and for suspending the same. This object I accomplish by the construction and arrangement of parts illustrated in the accompanying drawings, wherein the same letters of reference indicate the same or corresponding parts in the different figures, and wherein—

Figure 1 is a side elevation of my improved suspended or hanging Argand gas-burner. Fig. 2 is a longitudinal section of a portion of the same. Fig. 3 is a detail top plan view of the bracket or center connection of the burner. Fig. 4 is a longitudinal section of the same, with its central tube, which is in the form of a truncated cone, and with the short vertical pipe in side elevation; and Fig. 5 is a transverse section on line 5 5, Fig. 4, of the lower end of the short vertical pipe and the plug or pivotal support through which the gas passes and which supports the burner and its adjuncts. Fig. 6 is an enlarged broken sectional view of a portion of the gas-chamber, showing the perforations in the series of rings therein as graduated in fineness.

The letter A, Fig. 1 of the drawings, represents a short section of gas-pipe to which my improved lamp or burner is attached.

B represents an ordinary stop-cock, which is employed for cutting off the supply of gas when it is desired to remove the burner for cleaning the globe or other purposes.

D is the deflector, from which is suspended the shade E.

F denotes the supply-pipe, which connects with the gas-pipe and supports the burner and globe from its lower end. At a slight distance above the lower end of this pipe it is formed into spiral coils. Around these coils is placed an inverted bell-shaped or conical deflector, G, which is made of any suitable white or light-colored substance which will withstand the effects of repeated heating and cooling and afford a white background for the light. This deflector also conceals from view the coils in the pipe; also, it being placed centrally above the burner and being somewhat larger than the flame-exit of the same, the light will be spread out into a larger circle and have its brilliancy increased. Another important function of this deflector is that when it becomes heated by the flame from the chamber it heats the coils of the gas-pipe within it and also the gas therein, which is thus increased in illuminating power, and also effects economy in consumption through more complete combustion.

The lower end of the supply-pipe F is screw-threaded, a ring, H, being screwed thereon for forming a support for deflector G. A short vertical pipe, I, is also screw-threaded interiorly at both ends, and is screwed over the lower end of said supply-pipe and against said ring H, thus forming a tight joint between these parts. Extending upward some distance within the pipe last-named is the threaded upper end of a plug or support, J, which is straight or cylindrical in form for some distance from its top, and then descends in the form of a frustum of a cone. A transverse groove is formed in the lower end of this plug for the admission of a screw-driver for removing or tightening the same.

K is a bracket or central connection provided with an opening in its center of the same shape as the exterior lower part of the support or plug J, which it loosely surrounds and from which it depends. This bracket is also provided with a lug, L, at a point just below the short pipe I, and the latter has formed in its lower end an elongated angular slot, L', within which said lug enters. The bracket K is also provided with hollow radial arms k, which lead from its central opening outward to the gas-burner. The plug J has a vertical aperture closed at the bottom, and, also, outwardly-leading openings which correspond to and communicate with those in said bracket-arms. By means of the lug on the bracket and the slot in the short pipe these openings can be regulated to discharge the desired amount of gas into the gas-chamber or to cut it off therefrom entirely; but they can be moved no farther than is necessary. In order to turn the bracket K, a nipple, M, is screwed into its bottom opening. This nipple is provided with a rim or flange, m, midway of its length, upon which rests the gallery, which is tightly held between said rim and the walls of the central opening of the bracket. To the lower end of the nipple is attached a handle, N, made of suitable heat-non-conducting substance—as, for instance, wood—which I preferably use. The handle is provided around and within its top portion with a metallic ferrule, o, and is firmly secured to the lower end of the nipple by a suitable pin or rivet. As the gas is much heated in its passage through the coils of the supply-pipe, and as the parts communicating with the latter are made of metal, and also become heated, it is obvious that it would be difficult to manipulate the handle were it heated too; hence to avoid this the handle should be made of some material that is a non-conductor of heat, whereby it may be operated without injury or inconvenience.

Within the gas-burner I place a perforated ring of suitable thickness to hold the walls of the burner at a proper distance apart. Above this ring is another perforated ring, and above this one is another having still finer perforations, as plainly shown in the drawings. The gas passing into the lower portion of the chamber is retarded and divided by the two lower rings, and by the upper one it is more finely divided and equally distributed, whereby an even and uniform flame is produced and flickering prevented.

From the foregoing it will be seen that in order to operate the burner when the stop-cock B is open the handle N being turned, and with it the bracket having the hollow arms, which register with the openings in the plug J, the gas can be supplied in regulated quantities to the gas-burner or entirely shut off, as desired; also, that by closing the stop-cock B, which shuts off the gas, and by turning the handle N, and consequently moving the bracket until the stop L at its upper end comes in contact with the end of the slot L' in the lower end of the short pipe I, the further movement of said handle, bracket, and pipe will unscrew said pipe from the supply-pipe F, thus removing the burner and globe for the purpose of repairing or adjusting the former and cleaning the latter, as may be desired. These parts can be readily replaced and reattached to the supply-pipe.

Some of the features of construction shown in the drawings are not herein described nor claimed, as they are embodied in one or more applications which I have filed and which are now pending.

It is evident that minor changes in the construction and arrangement of the parts can be made and substituted in lieu of those which I have herein disclosed without departing from the nature or spirit of my invention.

Having thus described my invention, what I claim as new is—

1. In an Argand gas-burner, the combination, with the supply-pipe, coiled in the manner and for the purpose described, of the gas-burner provided with gas distributing and retarding devices, the fire-proof deflector of greater diameter than the flame-exit of said burner, and the movable adjustable regulating-bracket for controlling the flow of gas to the burner, as specified.

2. The combination, with the nipple-pipe coiled in the manner and for the purpose described, of the gas-burner provided with gas distributing and retarding devices, the fire-proof deflector of greater diameter than the flame-exit of said burner, the adjustable regulating-bracket having radial tubular openings, the suspended plug supporting said adjustable bracket and provided with openings which register with the openings of the said bracket, and means for changing the relative registrations of the respective openings of the plug and bracket, substantially as described.

3. The combination, with the adjustable bracket, having radial openings as described, and suspended by a suitable coupling from the plug J, of the plug J, having openings which normally register with the openings of the adjustable bracket, the coupling between the said bracket and plug for regulating the admittance of the gas, the supply-pipe and the nipple or handle N, formed of heat-non-conducting material, as specified.

4. The combination, with the supply-pipe coiled in the manner and for the purpose described, of the gas-burner having heat regulating and distributing devices, means for regulating the flow of gas to said burner, the bell-shaped deflector of larger diameter than the flame-exit of the said gas-burner and supported around the coils of the supply-pipe, and the ring screwed to the supply-pipe and supporting the deflector, as specified.

5. The combination, with the Argand gas-burner, of a series of perforated and relatively-graduated rings arranged in proper relative positions within the burner-chamber for equally distributing the gas to the flame-exit, the bell-shaped deflector of larger diameter than the said flame-exit and supported around the coils of the supply-pipe, the coiled supply-pipe, and means for admitting and regulating a flow of gas to the said burner, as specified.

6. The combination of the Argand gas burner provided with the three rings of increasing fineness from the lowest to the uppermost, the supply-pipe, the adjustable regulating-bracket having radial tubes, the short slotted pipe, and the handle having the lug, substantially as and for the purpose described.

7. The combination, with the Argand gas-burner, of the pipe I, the adjustable regulating-bracket having a screw-threaded central aperture, the screw-threaded nipple M, having the peripheral rim or flange, the gallery supported in the manner described, and the adjusting-handle formed of heat-non-conducting material, as specified.

8. The combination of the supply-pipe F, the short pipe I, having the slot L' at its lower end, the plug J, the bracket K, having the lug L arranged to be turned in the slot in said pipe I, and means for turning said bracket, substantially as described.

In testimony whereof I affix my signature in presence of two witnesses.

ELIAS BEACH.

Witnesses:
WM. E. HINCHLIFF,
F. C. SCHOENTHALER.